(12) United States Patent
Shintani

(10) Patent No.: US 8,373,795 B2
(45) Date of Patent: Feb. 12, 2013

(54) CAMERA BODY AND IMAGING DEVICE TO WHICH A LENS UNIT CONFIGURED TO FORM AN OPTICAL IMAGE OF A SUBJECT CAN BE MOUNTED

(75) Inventor: Dai Shintani, Osaka (JP)

(73) Assignee: Panasonic Corporation, Osaka (JP)

( * ) Notice: Subject to any disclaimer, the term of this patent is extended or adjusted under 35 U.S.C. 154(b) by 621 days.

(21) Appl. No.: 12/552,853

(22) Filed: Sep. 2, 2009

(65) Prior Publication Data

US 2010/0060771 A1   Mar. 11, 2010

(30) Foreign Application Priority Data

Sep. 10, 2008 (JP) .................. 2008-232070

(51) Int. Cl.
*H04N 5/222* (2006.01)
*H04N 5/225* (2006.01)
(52) U.S. Cl. ........................ 348/371; 348/374
(58) Field of Classification Search .......... 348/371–376; 396/176, 205, 206, 535–541
See application file for complete search history.

(56) References Cited

U.S. PATENT DOCUMENTS

| 7,525,596 | B2 * | 4/2009 | Yamaguchi | 348/375 |
| 2005/0280736 | A1 * | 12/2005 | Baba | 348/371 |
| 2006/0170806 | A1 * | 8/2006 | Saiki et al. | 348/333.01 |
| 2008/0193121 | A1 * | 8/2008 | Miyazaki | 396/299 |
| 2009/0002541 | A1 * | 1/2009 | Niwamae | 348/335 |

FOREIGN PATENT DOCUMENTS

| JP | 2003-161993 A | 6/2003 |
| JP | 2006-078898 A | 3/2006 |
| JP | 2007-318644 A | 12/2007 |

* cited by examiner

*Primary Examiner* — Timothy J Henn
(74) *Attorney, Agent, or Firm* — Panasonic Patent Center

(57) ABSTRACT

A camera body allows the mounting of a lens unit configured to form an optical image of a subject, and includes a body mount, an imaging element, a shutter, a shutter drive device, and an electronic viewfinder. The body mount allows a lens unit to be mounted. The imaging element includes a light receiving face arranged to receive light passing through the lens unit, and converts an optical image of the subject into an electrical signal. The shutter is disposed between the body mount and the imaging element, and arranged to block light passing through the lens unit. The shutter drive device controls the exposure time of the imaging element by driving the shutter. The electronic viewfinder includes an eyepiece, a viewfinder image display unit configured to electronically display an image of the subject, and a viewfinder optical system arranged to guide the subject image displayed by the viewfinder image display unit to the eyepiece. The electronic viewfinder is disposed above the shutter drive device and beside the body mount when viewed in a first direction perpendicular to the light receiving face in a landscape orientation.

18 Claims, 6 Drawing Sheets

CAMERA BODY AND IMAGING DEVICE TO WHICH A LENS UNIT CONFIGURED TO FORM AN OPTICAL IMAGE OF A SUBJECT CAN BE MOUNTED

CROSS-REFERENCE TO RELATED APPLICATIONS

This application claims priority to Japanese Patent Application No. 2008-232070 filed on Sep. 10, 2008. The entire disclosure of Japanese Patent Application No. 2008-232070 is hereby incorporated herein by reference.

BACKGROUND

1. Technical Field

The technical field relates to a camera body to which a lens unit can be mounted, and to an imaging device equipped with this camera body.

2. Description of the Related Art

An interchangeable lens type of digital camera, with which a lens unit can be interchanged, is disclosed in Japanese Laid-Open Patent Application 2003-161993. This camera includes an electronic viewfinder and a flash light emitter. The electronic viewfinder includes a display device and a mirror, and the display face of the display device is disposed parallel to the optical axis. An image displayed on the display face is observed at an eye-level position via the mirror. The flash light emitter is disposed in the space produced at the rear face of the mirror.

SUMMARY

There has always been a great need for interchangeable lens digital cameras to be made more compact.

However, a conventional interchangeable lens digital camera is equipped with a mirror box, which makes it difficult to reduce the size of the camera body.

In view of this, the inventors came up with a novel interchangeable lens type of digital camera that did not have a mirror box. Also, the inventors introduced a display device that combines a viewfinder function and is disposed on the camera rear face or an electronic viewfinder, instead of a conventional optical viewfinder equipped with a reticle, pentaprism, or the like.

However, if an electronic viewfinder is disposed where a conventional optical viewfinder function component used to be disposed, there needs to be the same amount of space above the body mount as when a pentaprism or the like is disposed, and the various parts cannot be disposed efficiently, which hampers efforts at making the camera body smaller.

The technology disclosed here is intended to reduce the size of a camera body.

A camera body according to the first aspect allows the mounting of a lens unit configured to form an optical image of a subject, comprises a body mount, an imaging element, a shutter, a shutter drive device, and an electronic viewfinder. The body mount allows a lens unit to be mounted. The imaging element includes a light receiving face arranged to receive light passing through the lens unit, and converts an optical image of the subject into an electrical signal. The shutter is disposed between the body mount and the imaging element, and arranged to block light passing through the lens unit. The shutter drive device controls the exposure time of the imaging element by driving the shutter. The electronic viewfinder includes an eyepiece, a viewfinder image display unit configured to electronically display an image of the subject, and a viewfinder optical system arranged to guide the subject image displayed by the viewfinder image display unit to the eyepiece. The electronic viewfinder is disposed above the shutter drive device and beside the body mount when viewed in a first direction perpendicular to the light receiving face in a landscape orientation.

The landscape orientation referred to here is the orientation of the camera body in which the vertical direction in the acquired image is substantially parallel to the short sides of the image in a state in which the light receiving face of the imaging element has a rectangle that is wider than it is tall. More precisely, it refers to the orientation of the camera body when the face on which the shutter button or hot shoe is provided, for example, is located above the imaging element in the vertical direction.

With this camera body, the electronic viewfinder is disposed beside the body mount. That is, the electronic viewfinder is disposed so that it is not above the body mount, which is relatively large in the up and down direction. Also, the electronic viewfinder is disposed above the shutter drive device, which is relatively small in the up and down direction. This allows the various parts to be disposed more efficiently, so the camera body can be more compact.

An imaging device according to the second aspect is an imaging device for acquiring an image of a subject, comprising a lens unit configured to form an optical image of a subject, and the camera body according to the first aspect, to which a lens unit can be mounted.

In this case, since the imaging device is equipped with the camera body according to the first aspect, the imaging device can be made more compact.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

The digital camera according to this embodiment (an example of an imaging device) comprises the camera body 1 and a lens unit.

1: Lens Unit

The lens unit (not shown) includes an optical system (not shown) that forms an optical image of a subject, a lens mount (not shown) having an electrical contact (not shown), and a lens controller (not shown). The lens mount is mounted to a body mount 150 (discussed below) of the camera body 1. Hereinafter the optical axis center line of the optical system of the lens unit will be called the first optical axis. The line AX1 in FIG. 3 indicates the optical axis center line of the optical system (first optical axis). The lens controller holds lens data related to the use of the lens unit and so forth, and lens data can be transferred through the electrical contact to a camera controller (not shown) mounted to a main circuit board 140 (discussed below) of the camera body 1. Focus lens drive control, aperture drive control, blur correction control, and so forth are performed by the lens controller and the camera controller.

2: Camera Body 2-1: Overview of Camera Body

Figure 1:
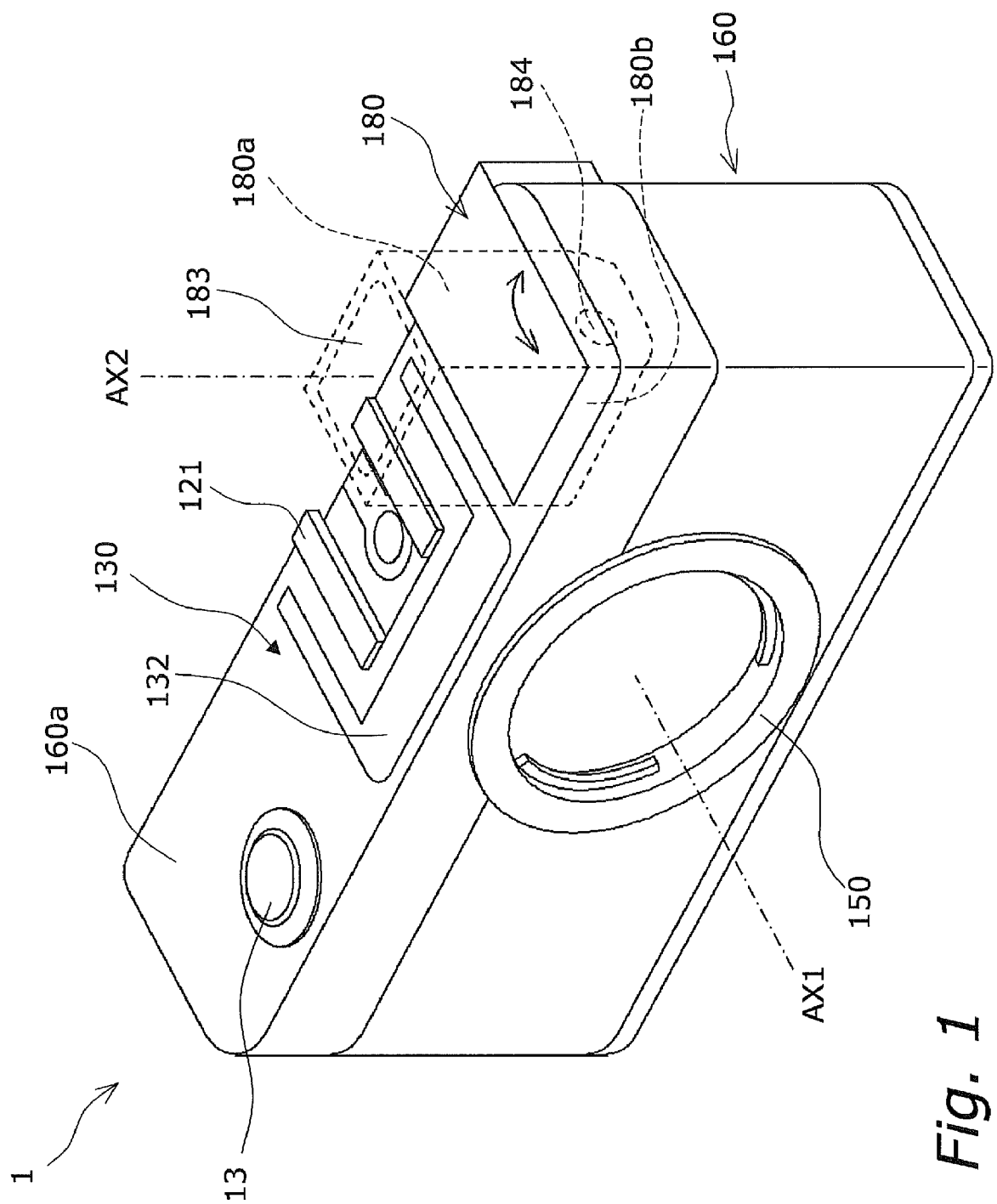
FIG. 1 is an oblique view of a camera body 1 (an example of a camera body)
Figure 2:
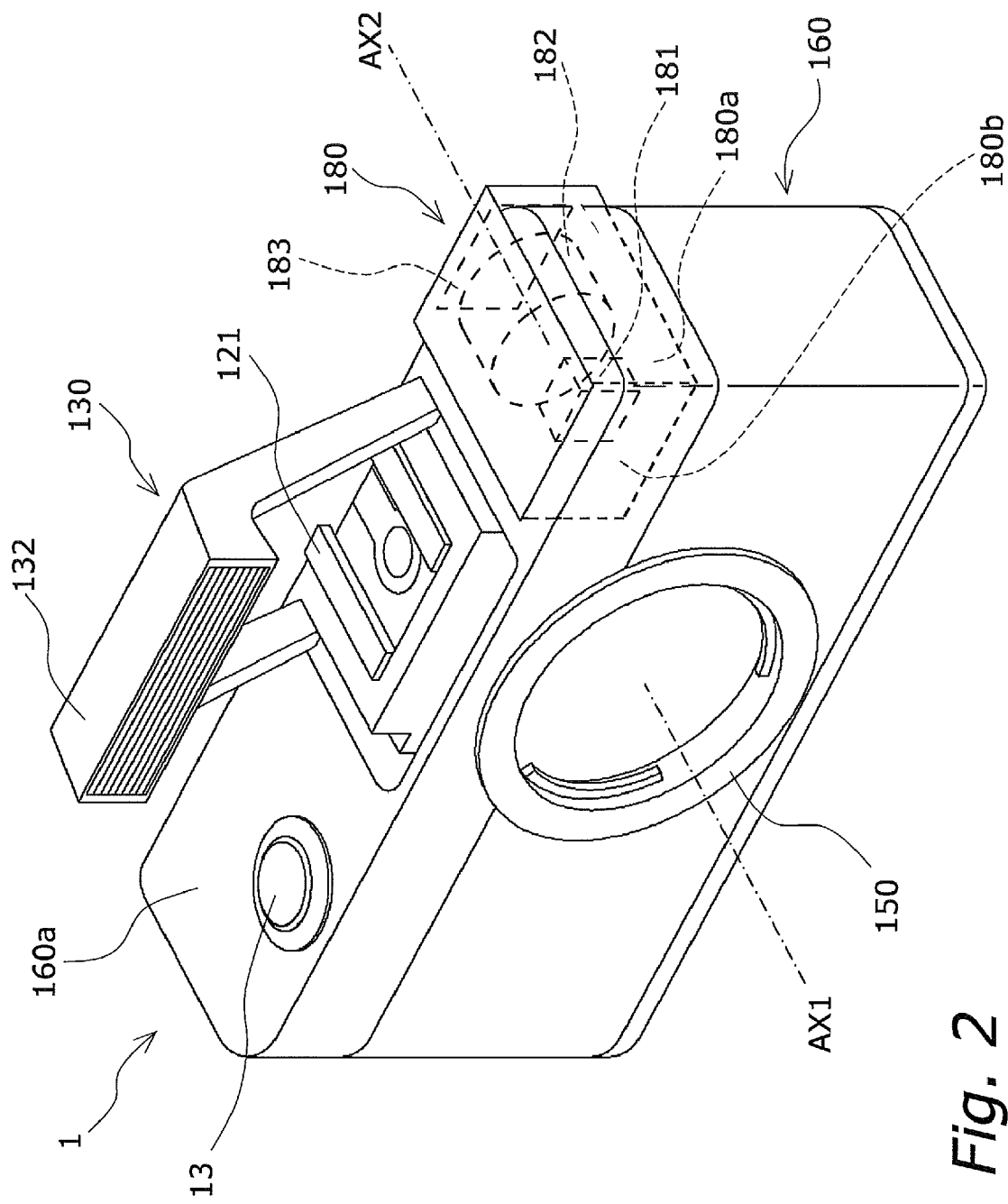
FIG. 2 is an oblique view of the camera body 1 when the flash has popped up.
Figure 3:
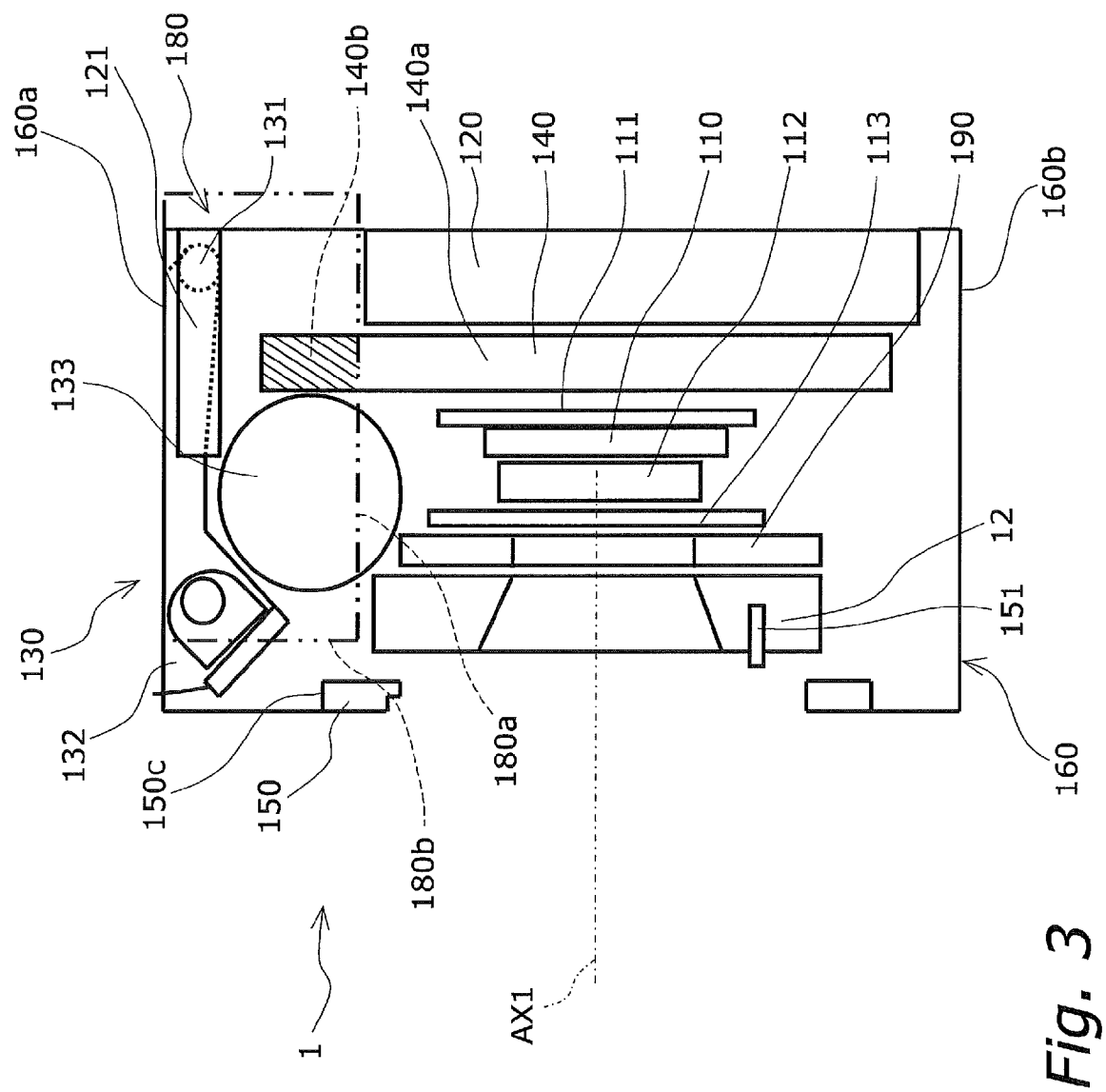
FIG. 3 is a middle, vertical cross section of the camera body 1.
Figure 4:
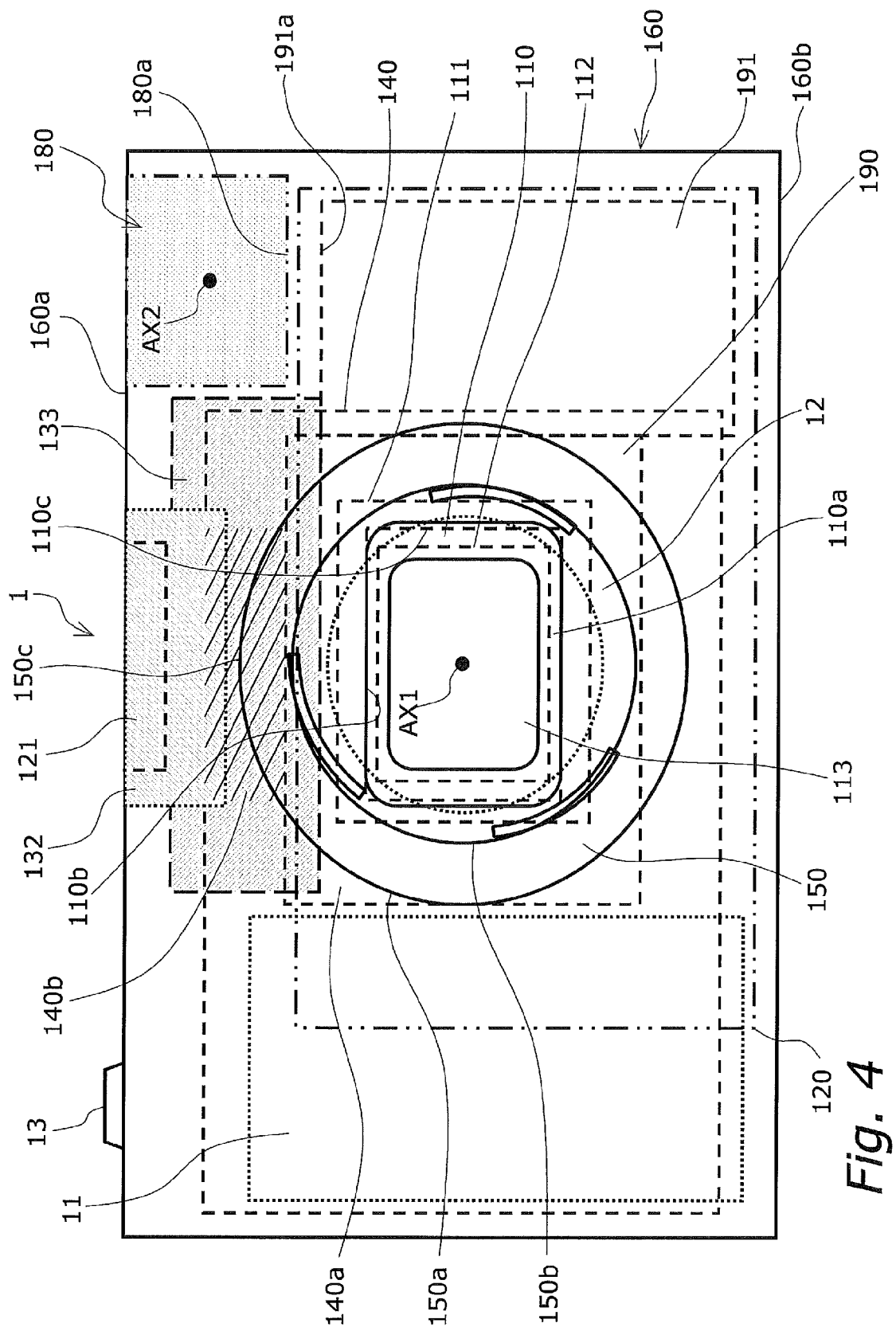
FIG. 4 is a front see-through view of the camera body 1.
Figure 5:
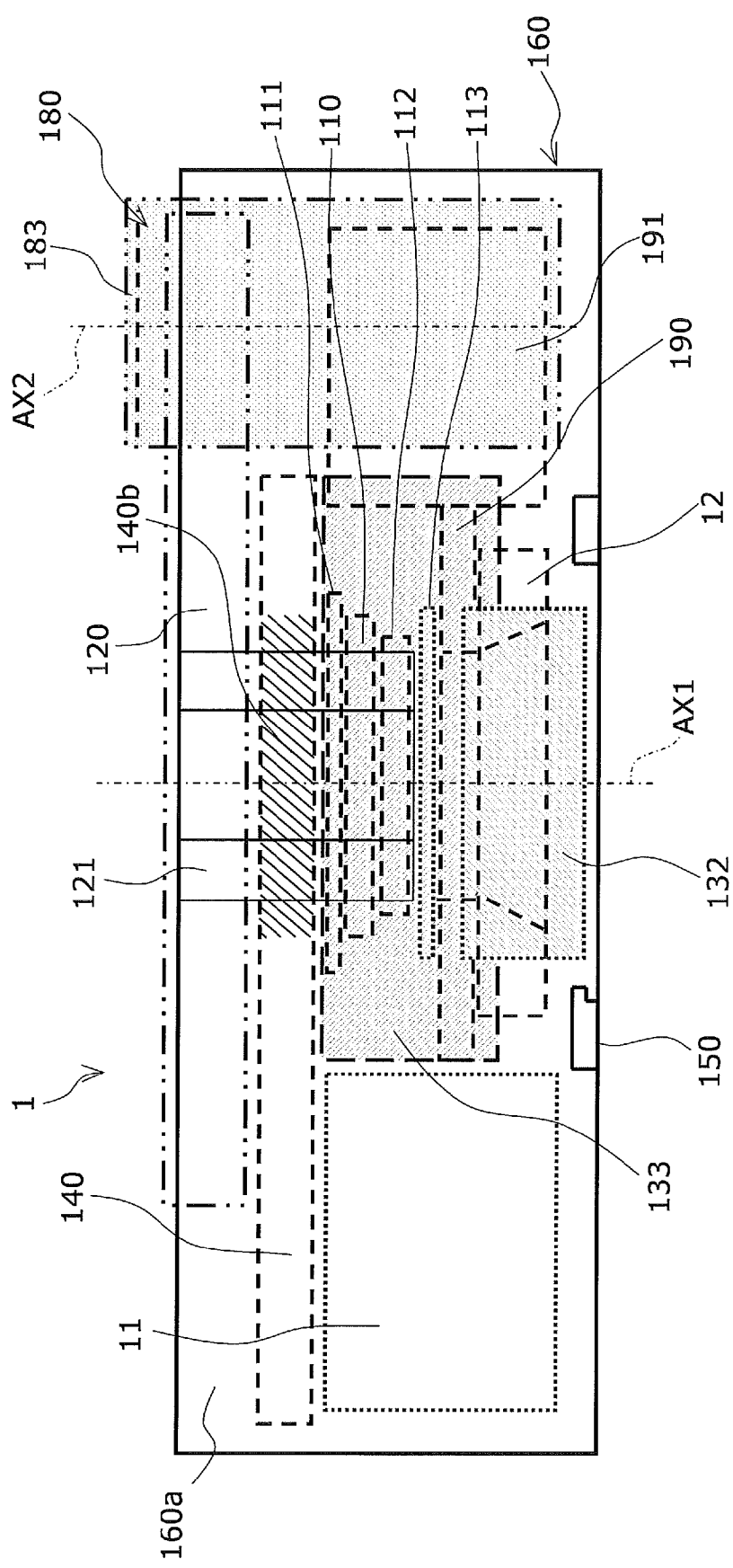
FIG. 5 is a top see-through view of the camera body 1.

FIG. 1 is an oblique view of the camera body 1 according to this embodiment. FIG. 2 is an oblique view of the camera body 1, and shows a flash light emitter 132 in its popped up state. FIG. 3 is a middle, vertical cross section of the camera body 1. FIG. 4 is a front see-through view of the camera body 1. FIG. 5 is a top see-through view of the camera body 1.

As shown in FIG. 3, the camera body 1 has no mirror box. Accordingly, its flange back is smaller than that of a conventional single lens reflex camera. Making the flange back smaller also reduces the size of the camera body. Furthermore, making the flange back smaller reduces the size of the lens unit. The various components will now be described in detail. To facilitate the description, the subject side of the camera body 1 will be referred to as the front, the image plane side as the rear or back, the vertical upper side in the normal orientation of the camera body 1 (also called landscape orientation) as the top or above, the vertical lower side as the bottom or below, the left and right as the sides, the left as viewed from the subject side as the left side, and the right as viewed from the subject side as the right side.

Here, landscape orientation refers to the orientation of the camera body 1 in which the vertical direction in the acquired image is substantially parallel to the short sides of the image, and more precisely, refers to the orientation of the camera body 1 in which the face on which the shutter button 13 (discussed below) or hot shoe 121 (discussed below) is provided is located on the vertical upper side with respect to a CMOS image sensor 110 (discussed below).

The "height" here refers to the distance in the up and down direction (discussed below) measured from the side face 160b (discussed below). The highest position in the up and down direction (discussed below) is called the upper end, and the lowest position in the up and down direction is called the lower end.

The direction perpendicular to the light receiving face 110a (discussed below) of the CMOS image sensor 110 will hereinafter be termed the first direction. The left and right direction in landscape orientation will be termed the second direction. The vertical direction in landscape orientation will be termed the third direction (also called the up and down direction). The second and third directions are parallel to the light receiving face 110a. That is, the second direction is parallel to the long sides 110b (discussed below), and the third direction is parallel to the short sides 110c (discussed below).

2-1: Configuration of Camera Body

The configuration of the camera body 1 according to this embodiment will be described through reference to FIGS. 1 to 5.

The camera body 1 mainly includes a CMOS (complementary metal oxide semiconductor) image sensor 110, a CMOS circuit board 111, a display device 120, the main circuit board 140, the body mount 150, an electronic viewfinder 180, a shutter unit 190, an optical low-pass filter 112, a diaphragm 113, a battery 11, a flash device 130, the hot shoe 121, and a housing member 160. The camera body 1 does not have a mirror box. The body mount 150, the shutter unit 190, the diaphragm 113, the optical low-pass filter 112, the CMOS image sensor 110, the CMOS circuit board 111, the main circuit board 140, and the display device 120 are disposed in that order, starting from the front, in the camera body 1.

The housing member 160 has a body 12, an upper face 160a, and a bottom face 160b, and accommodates in its interior the CMOS image sensor 110, a capacitor 133, and other such parts. As shown in FIG. 3, the body 12 is a member that supports the body mount 150, and an electrical contact 151 is provided that can be connected with the electrical contact of the lens mount.

As shown in FIGS. 1 and 4, the upper face 160a of the housing member 160 (that is, the camera body 1) is the outer face of the housing member 160, and is the outer face that is above the CMOS image sensor 110 (discussed below) when viewed in a first direction (discussed below) when the camera body 1 is in its landscape orientation, while the bottom face 160b is the outer face on the bottom of the CMOS image sensor 110.

The CMOS image sensor 110 (an example of an imaging element) converts an optical image of a subject into an electrical image signal. The CMOS image sensor 110 has a light receiving face 110a that receives light passing through the lens unit. In this embodiment, the light receiving face 110a is rectangular, and has long sides 110b and short sides 110c. The light that passes through the lens unit forms an optical image of a subject on the light receiving face 110a, and the CMOS image sensor 110 produces an image signal of the subject by opto-electric conversion from the optical image thus formed. The CMOS image sensor 110 is controlled by the CMOS circuit board 111 (discussed below), and acquires still picture signals and moving picture signals. These still picture signals and moving picture signals are just examples of image signals.

Since the light receiving face 110a here is rectangular, the images acquired by the CMOS image sensor 110 are also rectangular, and have long and short sides. When the camera body 1 is in its landscape orientation, the vertical direction in the acquired image is substantially parallel to the short sides of the image.

The CMOS image sensor 110 is an example of an imaging element, and this imaging element is a concept that encompasses a CCD (charge coupled device) image sensor and the like.

The CMOS circuit board 111 is a circuit board that is disposed behind the CMOS image sensor 110 and controls the drive of the CMOS image sensor 110. More specifically, the CMOS circuit board 111 has a timing generator and controls the operation of the CMOS image sensor 110. The CMOS circuit board 111 is also a circuit board that subjects image signals produced by the CMOS image sensor 110 to specific processing. For example, the CMOS circuit board 111 has an A/D converter and converts the analog image signals produced by the CMOS image sensor 110 into digital image signals.

The main circuit board 140 is a board on which the various electronic parts that control the various components of the digital camera are mounted. More specifically, a camera controller that controls the various components of the camera body 1 and the lens unit is mounted on the main circuit board 140.

The camera controller adjusts the exposure time of the CMOS image sensor 110 by controlling a shutter drive device 191 (discussed below) and actuating the shutter unit 190.

The camera controller also controls the CMOS circuit board 111. The CMOS circuit board 111 controls the imaging element and performs image signal processing and so forth on the basis of control signals inputted from the camera controller.

The camera controller further processes the image signals that have been produced by the CMOS image sensor 110 and have undergone A/D conversion or other processing by the CMOS circuit board 111, to produce image data (or video data). More specifically, the camera controller produces display-use image data (or display-use video data) or recording-use image data (or recording-use video data). More precisely, the camera controller subjects the image signals acquired from the CMOS circuit board 111 to gamma correction processing, white balance correction processing, scratch correction processing, YC conversion processing, electronic zoom processing, JPEG (Joint Photographic Experts Group) compression processing, or other such processing. The display-use image data (or display-use video data) thus produced is displayed on the display device 120 (discussed below) or the electronic viewfinder 180 (discussed below). Also, the recording-use image data (or recording-use video data) thus produced is recorded to a recording medium (not shown).

Also, as discussed above, the camera controller controls the lens unit through the lens controller.

The camera controller is electrically connected to the shutter button 13 and other such controls, and receives signals inputted from the controls. Information obtained from signals inputted from the controls is used by the camera controller in controlling the various components of the digital camera.

As shown in FIG. 4, the main circuit board 140 in this embodiment has a standard part 140a disposed on the opposite side from the body mount 150 with respect to the CMOS image sensor 110, and a protruding part 140b that extends above the imaging element from the standard part 140a in landscape orientation.

The display device 120 is a liquid crystal display, for example, and displays an image indicating the display-use image data, etc. (hereinafter referred to as a display-use image). The display-use image data is image signals that have undergone image processing, the photography conditions of the camera body 1, data for displaying control menus and so forth as images, and the like. The display device 120 is able to selectively display both moving pictures and still pictures.

The display device 120 can instead be an organic electroluminescence device, an inorganic electroluminescence device, a plasma display panel, or something else capable of displaying images.

The electronic viewfinder (hereinafter also referred to as EVF) 180 has an EVF liquid crystal monitor 181, an EVF optical system 182, and an eyepiece 183, and displays an image of the subject. The EVF 180 is able to selectively display both moving pictures and still pictures. Also, the EVF 180 and the display device 120 may display the same or different content.

The EVF liquid crystal monitor 181 (an example of a viewfinder image display unit) electronically displays a display-use image or a display-use video image. The term "display-use video image" here is a video image represented by display-use video data.

The EVF liquid crystal monitor 181 is an example of a viewfinder image display unit. The viewfinder image display unit is a device that displays images, and in addition to a liquid crystal monitor, it can be an organic electroluminescence device, an inorganic electroluminescence device, a plasma display panel, or another such device. The EVF liquid crystal monitor 181 is equipped with an illumination light source, but if an organic electroluminescence device or other self-luminous device is used as the viewfinder image display unit, there is no need to provide an illumination light source.

The EVF optical system 182 (an example of a viewfinder optical system) magnifies the image displayed by the EVF liquid crystal monitor 181. Herein, the optical axis center line of the EVF optical system 182 will be referred to as the second optical axis. The line AX2 in FIG. 2 indicates the optical axis center line of the EVF optical system 182 (second optical axis).

The image magnified by the EVF optical system 182 is guided to the eyepiece 183. The user looks through the eyepiece 183 to observe the image magnified by the EVF optical system 182.

The user puts his eye close to the EVF 180 to observe the image displayed by the EVF 180. That is, whereas the EVF 180 has the eyepiece 183, the display device 120 has no eyepiece.

In FIG. 2, the second optical axis (the optical axis AX2 of the EVF optical system 182) is substantially parallel to the first optical axis (the optical axis AX1 of the lens unit). When the EVF 180 is in the state shown in FIG. 2, it is said to be in its first disposition state. The first disposition state referred to here is known as the eye level position. That is, the first disposition is suited to a case when the user raises the eyepiece 183 to eye level and looks into it. Hereinafter, the first disposition of the EVF 180 in this embodiment will also be referred to as the eye level position.

The EVF 180 is connected by a rotary shaft 184 so as to be rotatable with respect to the camera body 1. By rotating around the rotary shaft 184, the EVF 180 can assume a state other than the eye level position (first disposition). When it is in a state other than the eye level position (first disposition), the EVF 180 is said to be in a state of second disposition. The disposition of the EVF 180 indicated by the dotted line in FIG. 1 is an example of the second disposition, and with the EVF 180 indicated by the dotted line in FIG. 1, the second optical axis (AX2) is substantially at a right angle to the first optical axis (AX1). The disposition of the EVF 180 indicated by the dotted line in FIG. 1 here is known as the waist level position. The disposition of the EVF 180 indicated by the dotted line in FIG. 1 here is one in which the user can look down at the eyepiece 183 while holding the camera body 1 below eye level. The second disposition of the EVF 180 in this embodiment will hereinafter also be referred to as the waist level position.

The body mount 150 allows the mounting of the lens unit. The lens unit is mounted to the body mount 150 by what is known as bayonet coupling.

When the lens unit has been mounted, the electrical contact 151 is connected to the electrical contact of the lens mount, so the lens unit is electrically connected to the camera body 1. In other words, data and control signals can be sent back and forth between the camera body 1 and the lens unit via the electrical contact 151 and the electrical contact of the lens mount. More specifically, data issued by the lens controller inside the lens unit goes through the electrical contact 151 and the electrical contact of the lens mount and is transmitted to the camera controller inside the camera body 1. The camera controller produces a control signal on the basis of the inputted data, and transmits it to the lens controller. The lens controller controls the various units of the lens unit on the basis of control signals inputted from the camera controller via the electrical contact 151 and the electrical contact of the lens mount.

As shown in FIG. 4, the body mount 150 is a circular ring-shaped member, and has an outer edge 150a and an inner edge 150b. A first upper end 150c (an example of the upper end of the body mount) is on the outer edge 150*a*, and is the upper end of the body mount 150. That is, the first upper end 150*c* represents the highest position of the outer edge 150*a* in a state of landscape orientation.

The shutter unit 190 (an example of a shutter) is a focal plane shutter, and has a front curtain (not shown) and a rear curtain (not shown). The exposure time of the CMOS image sensor 110 is adjusted by a slit formed between the front and rear curtains. As shown in FIG. 3, the shutter unit 190 is disposed between the body mount 150 and the CMOS image sensor 110.

The shutter drive device 191 drives the shutter with respect to the shutter unit 190. That is, a slit is formed between the front and rear curtains when the shutter drive device 191 makes run the front and rear curtains. The shutter drive device 191 also performs charging drive. That is, the shutter drive device 191 is set in a state in which the front and rear curtains can run by using the electrical drive force produced by an electromagnetic motor or the like provided inside the shutter drive device 191.

The optical low-pass filter 112 removes the high-frequency component of the subject light. More specifically, the optical low-pass filter 112 separates the high-frequency component of the subject light formed by the lens unit so that the resolution is lower than the pixel pitch of the CMOS image sensor 110. In general, a YCM complementary color filter or RGB color filter called a Bayer array is provided for each pixel of the CMOS image sensor 110 or other such imaging element. Therefore, if a subject image is resolved directly, not only is a false color generated, but if the subject has a repeating pattern, an unattractive moire will result. Furthermore, the optical low-pass filter 112 has an Ir cut filter function for cutting out infrared light.

The diaphragm 113 is disposed between the CMOS image sensor 110 and the shutter unit 190, and prevents dust from clinging to the CMOS image sensor 110. Also, any dust clinging to the diaphragm 113 itself is knocked off by the vibration of the diaphragm 113. More specifically, the diaphragm 113 has a thin, transparent sheet-like member, a piezoelectric element, and a fixed member, with the sheet-like member being fixed to the fixed member via the piezoelectric element. When AC voltage is applied to the piezoelectric element, the piezoelectric element vibrates, and the piezoelectric element in turn vibrates the sheet-like member.

An antifogging layer is formed on the front face of the diaphragm 113. More specifically, a transparent coating of a photocatalyst such as titanium oxide is applied. The antifogging layer may be formed not only on the front face of the diaphragm 113, but also on the front face of the optical low-pass filter 112, or on the front face of the CMOS image sensor 110. However, an antifogging layer is preferably formed on the front face of the member disposed farthest forward out of the members that transmit light from the lens unit and disposed along the optical path from the lens unit to the CMOS image sensor 110. In view of this, in this embodiment the antifogging layer is formed on the diaphragm 113 disposed between the CMOS image sensor 110 and the shutter unit 190. Consequently, when the shutter unit 190 is in its open state, dirt, water (such as saliva), oil, or the like can come in from the body mount 150 and adhere to the surface of the diaphragm 113. This adhering dirt is easily removed from the surface of the diaphragm 113 by the titanium oxide, which is a photocatalyst. More specifically, when light hits the titanium oxide on the antifogging layer formed on the diaphragm 113, the titanium oxide has electrons taken away, and produces a powerful oxidizing force. Hydroxide ions in the air take away electrons by the oxidizing force of the titanium oxide, and become hydroxy radicals with a powerful oxidizing force. Hydroxy radicals rob electrons from nearby organic substances contained in dirt, and the organic substances decompose into water and carbon dioxide and are released in to the air. The effect here is enhanced if the diaphragm 113 is vibrated.

The photocatalyst is preferably one that absorbs UV rays, such as titanium oxide, or one that absorbs infrared rays. This is because these substances transmit visible light, so there will be less of a reduction in the visible light that reaches the CMOS image sensor 110. The antifogging layer may also be given a multilayer AR (antireflection) coating or the like that is resistant to fingerprints.

The shutter button 13 is disposed on the upper face 160*a* of the housing member 160, and is operated by being pressed down. When the shutter button 13 is pressed, an imaging operation is performed. More specifically, when the shutter button 13 is pressed, a release signal is sent from the shutter button 13 to the camera controller, and a control signal is sent from the camera controller to the shutter drive device 191. When this control signal is inputted, the shutter drive device 191 drives the shutter unit 190, and the exposure of the CMOS image sensor 110 is carried out.

As shown in FIGS. 3 and 4, the shutter button 13 is disposed on the left side of the body mount 150 when viewed from the subject side in the first direction (perpendicular to the light receiving face 110*a*) in landscape orientation. The left side of the body mount 150 is generally the side that the user grips with one hand to hold the camera body 1 (hereinafter referred to as the grip side), so in other words, with the camera body 1, the shutter button 13 is provided on the grip side.

The capacitor 133 stores electrical charges, and supplies power by releasing the stored charge. For example, power stored in the capacitor 133 is supplied to the flash device 130 (discussed below).

As shown in FIG. 4, when viewed in the first direction (perpendicular to the light receiving face 110*a*) in landscape orientation, the capacitor 133 is disposed above the CMOS image sensor 110, and the EVF 180 is disposed to the side of the capacitor 133.

The flash device 130 has a flash light emitter 132 and a pop-up hinge 131, and puts out flash light. The flash light emitter 132 emits flash light. More specifically, the flash light emitter 132 receives the supply of power from the capacitor 133, and emits light so as to match the timing at which the shutter unit 190 is operated. Flash light is emitted in a state in which the flash device 130 is popped up. FIG. 2 shows the popped up state of the flash device 130. The pop-up hinge 131 rotatably connects the flash device 130 with respect to the housing member 160.

The flash device 130 can be stowed in the camera body. FIG. 1 shows the state in which the flash device 130 has been stowed in the camera body 1. The flash device 130 in its popped up state turns into its stowed state in the camera body 1 by being rotated around the pop-up hinge 131.

The hot shoe 121 is disposed on the upper face 160*a* of the housing member 160, and allows universal external parts to be mounted. An example of such a universal external part is an attachable flash light emitting device.

The battery 11 supplies the various components with power for use by the camera body 1. The battery 11 may be a dry cell or a rechargeable cell.

As shown in FIG. 4, with the camera body 1, the battery 11 is disposed on the left side (grip side) of the body mount 150 when viewed from the subject side in the first direction in landscape orientation.

Also, something other than the battery 11 may be used as the power supply unit to supply power. For instance, the power supply unit may receive a supply of power from an external power supply via a power cord or the like, and then supply this power to the camera body 1.

3: Conventional Single Lens Reflex Camera

Figure 6:
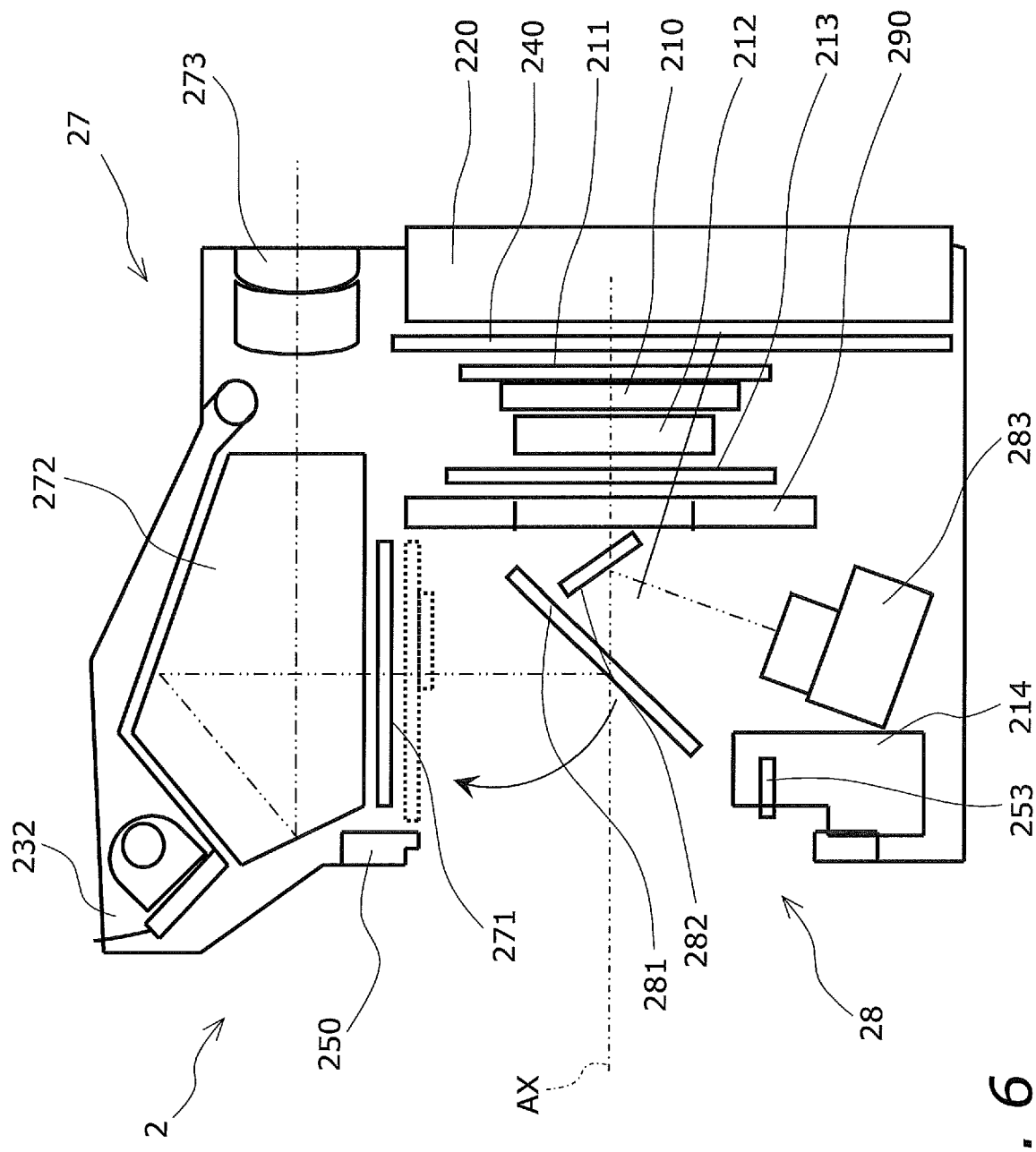
FIG. 6 is a middle, vertical cross section of a camera body 2 (the camera body of a conventional interchangeable lens type of single lens reflex camera).

A camera body 2 of a conventional interchangeable lens type of digital single lens reflex camera will now be described. FIG. 6 is a middle, vertical cross section of the camera body 2.

As shown in FIG. 6, the camera body 2 mainly includes a body 214, a CMOS image sensor 210, a CMOS circuit board 211, a display device 220, a main circuit board 240, a body mount 250, a mirror box 28, an optical viewfinder 27, a shutter unit 290, an optical low-pass filter 212, a diaphragm 213, a battery 21, and a flash device 230. Other than the mirror box 28, these have substantially the same function as the corresponding structures of the camera body 1, and will not be described again in detail.

With the mirror box 28, a semitransparent main mirror 281 is disposed in a state of being tilted upward by about 45 degrees, and the optical image of the subject produced by the lens unit and reflected by the main mirror 281 is guided to the optical viewfinder 27. At the main mirror 281, a total-reflection sub-mirror 282 is disposed facing downward, and the optical image of the subject reflected by the sub-mirror 282 is guided to an AF sensor 283. When a release subject is inputted, the main mirror 281 and the sub-mirror 282 are flipped up before the shutter unit 290 starts its exposure, and an optical path to the CMOS image sensor 210 is ensured. Here, for example, the release signal is inputted to the camera body 2 when a shutter button (not shown) is pressed.

The AF sensor 283 is a phase difference detection module, for example, and detects the focal position. Information about the focal position acquired by the AF sensor 283 is sent to the lens unit, and drive of the focus lens of the lens unit is controlled on the basis of the focal position information thus sent.

The optical viewfinder 27 is a viewfinder that the user uses to check the optical image of the subject, and has a reticle 271, a pentaprism 272 having an image inversion function, and an eyepiece lens 273 that magnifies the optical image of the subject. The reticle 271 is disposed at a position where the optical distance from the main mirror 281 is equal to the optical distance between the CMOS image sensor 210 and the main mirror 281. Accordingly, an optical image of the subject is formed at the reticle 271 in the same focal state as that of the optical image of the subject formed at the CMOS image sensor 210. The optical image of the subject formed at the reticle 271 is inverted to an erect image by the pentaprism 272 and magnified by the eyepiece lens 273. Consequently, the user can check the optical image of the subject by looking through the eyepiece lens 273.

Since a flash light emitter 232 is usually disposed further above the pentaprism 272, with the conventional camera body 2, the size in the up and down direction tends to be larger, making a reduction in size more difficult.

The lens unit, just as with the camera body 1, can be attached by bayonet coupling to the body mount 250. After coupling, the camera body 2 is electrically connected with the lens unit by an electrical contact 253.

4: Layout of Parts

With the camera body 1 discussed above, unlike with the camera body 2, no mirror box is installed, so the optical viewfinder 27 can also be eliminated. The electronic viewfinder 180 is introduced in place of the optical viewfinder 27.

However, if the electronic viewfinder 180 is disposed in the same position where the conventional optical viewfinder 27 was disposed, the parts cannot be disposed efficiently, and this makes it harder to reduce the size of the camera body.

In view of this, with the camera body 1 a reduction in size is achieved mainly by manipulating the layout of the electronic viewfinder 180 and the shutter drive device 191.

More specifically, as shown in FIG. 4, the EVF 180 is disposed on the right side of the body mount 150 when viewed from the subject side in the first direction (perpendicular to the light receiving face 110*a*). The EVF 180 here is disposed above the shutter drive device 191.

The shutter button 13 and the battery 11 here are provided on the left side of the body mount 150. That is, the EVF 180 and the shutter drive device 191 can be said to be disposed on the opposite side from the shutter button 13 and the battery 11 with respect to the body mount 150. Furthermore, since a grip is generally provided on the left side of the body mount 150 for the user to hold the camera body 1, the EVF 180 and the shutter drive device 191 can be said to be disposed on the opposite side from the grip with respect to the body mount 150.

Thus, since no device that is necessary for imaging needs to be disposed on the grip side of the camera body 1, this leaves a relatively large space for disposing the battery 11, so a larger capacity battery can be used.

The shutter drive device 191 is configured so that its constituent parts such as the electromagnetic motor are disposed as far as possible below the upper end of the shutter unit 190, and is therefore at substantially the same height as the shutter unit 190. As a result, as shown in FIG. 4, a second upper end 191*a* of the shutter drive device 191 is disposed at a position that is lower than the position of the first upper end 150*c* of the body mount 150, and a relatively large space is produced above the shutter drive device 191 and to the side of the body mount 150. With the camera body 1, this space is effectively utilized to dispose the EVF 180.

Also, in a state of landscape orientation, a first bottom face 180*a* of the EVF 180 (an example of the lower end of the EVF) is disposed at a position that is lower than the position where the first upper end 150*c* of the body mount 150 is disposed. As a result, the size in the up and down direction of the camera body 1 is reduced as compared to when the EVF 180 is disposed above the body mount 150. The reason this layout is possible is that with the camera body 1, the EVF 180 is disposed so as not to be above the body mount 150, and the position where the lower end of the EVF 180 is disposed is not restricted by the body mount 150.

The first bottom face 180*a* here is the face at the lowest position when the EVF 180 is put in the eye level position (first disposition) in landscape orientation, and is an example of the lower end of the EVF 180. The "lower end of the EVF 180" refers to the lower end of the part in the lowest position in the up and down direction out of the parts constituting the EVF 180. The phrase "the parts constituting the EVF 180" refers mainly to the eyepiece 183, the EVF optical system 182, and the EVF liquid crystal monitor 181, but may encompass other constituent parts besides these. With the camera body 1, the housing that holds the eyepiece 183, the EVF optical system 182, and the EVF liquid crystal monitor 181 in its interior is included in the parts constituting the EVF 180. As shown in FIG. 1, the first bottom face 180*a* and the second bottom face 180*b* are outer faces of the EVF 180. In this embodiment, the lower end of the EVF 180 in the eye level position (first disposition) is the first bottom face 180*a* (see FIG. 2). On the other hand, in the waist level position (an example of the second disposition), the lower end of the EVF 180 is the second bottom face 180*b* (see FIG. 1).

As shown in FIG. 3, part of the EVF 180 overlaps the protruding part 140b of the main circuit board 140 when viewed in the second direction (the left and right direction in landscape orientation). That is, when viewed in the first direction, as shown in FIG. 4, the protruding part 140b protrudes upward beyond the first bottom face 180a of the EVF 180. The place where the protruding part 140b is disposed is the place where the conventional optical viewfinder 27 was disposed (see FIG. 6). Thus, with the camera body 1, disposing the protruding part 140b effectively utilizes the space produced by eliminating the optical viewfinder function.

Also, as shown in FIG. 3, the hot shoe 121 overlaps the EVF 180 when viewed in the second direction.

The universal external part that is mounted to the hot shoe 121 here is a relatively heavy part such as an external flash device, so the hot shoe 121 needs a certain amount of strength. The hot shoe 121 also has at its lower end a member such as electrical wiring for electrically connecting to the camera body 1. Accordingly, the hot shoe 121 is a part that is fairly thick. Since a fairly heavy universal external part is connected to the hot shoe 121, when the weight balance of the camera body 1 when the universal external part is mounted is taken into account, the hot shoe 121 in this embodiment is disposed above the body mount 150 (see FIG. 4).

However, with the camera body 1, since the EVF 180 is disposed to the side of the body mount 150, the hot shoe 121 and the EVF 180 can be disposed so as to overlap when viewed in the second direction, and the size of the camera body 1 can be reduced in the up and down direction.

Furthermore, when viewed in the second direction (the left and right direction in landscape orientation), the capacitor 133 is disposed above the CMOS image sensor 110 and farther to the CMOS image sensor 110 side than the body mount 150. That is, the place where the capacitor 133 is disposed in the camera body 1 corresponds to the place where the optical viewfinder 27 (see FIG. 6) was disposed in the conventional camera body 2. Also, the pop-up hinge 131 and the stowed flash light emitter 132 are disposed in the gap between the capacitor 133 and the housing member 160. Thus, the capacitor 133 and the flash device 130 are disposed so as to effectively utilize the space produced by eliminating the optical viewfinder function.

5: Features of Camera Body

The features of the camera body 1 described above are compiled below.

(1) With this camera body 1, the EVF 180 is disposed to the side of the body mount 150, that is, away from above the body mount 150, which is relatively large in the up and down direction. Furthermore, the EVF 180 is disposed above the shutter drive device 191, which can be made relatively small in the up and down direction. This allows the various parts to be disposed more efficiently, and makes it possible to obtain a more compact camera body 1.

(2) With the camera body 1, since the shutter drive device 191 is disposed to the side of the body mount 150, the EVF 180 disposed above the shutter drive device 191 is reliably disposed to the side of the body mount 150 and at least above the CMOS image sensor 110. Thus disposing the EVF 180 away from the CMOS image sensor 110 and the body mount 150 where the parts are disposed relatively densely allows the space inside the camera body 1 to be utilized more effectively.

(3) Since the shutter button 13 is generally disposed on the side on which the camera body 1 is held (that is, the grip side), if the EVF 180 is provided on the same side as the shutter button 13, then the user's hand and face will interfere when the shutter button 13 is operated, making it harder to see.

In view of this, with the camera body 1, the shutter drive device 191 is disposed on the opposite side from the shutter button 13 when viewed in the first direction (perpendicular to the light receiving face 110a) in a state of landscape orientation, and the EVF 180 is disposed above this, which makes the camera easier to operate. Furthermore, since the EVF 180 is disposed on the upper right of the camera body 1 when viewed from the subject side in the first direction (that is, on the upper left when viewed from the back of the camera body 1), this prevents the display device 120 from being soiled by contact with the user's nose when the user looks through the EVF 180.

Also, the shutter button 13 is generally disposed on the left side when viewed from the subject side in the first direction in a state of landscape orientation. Therefore, with this camera body 1, operation can be said to be facilitated by disposing the shutter drive device 191 on the right side when viewed from the subject side in the first direction perpendicular to the light receiving face 110a in the landscape orientation state of the camera body 1.

(4) With this camera body 1, since the EVF 180 is disposed so that it is not above the body mount 150, the main circuit board 140 can be disposed at a large site that is relatively near the CMOS image sensor 110 and above the CMOS image sensor 110. Accordingly, there is greater latitude in design and electrical wiring, and the size of the camera body 1 can be reduced by more efficient layout of the parts.

Furthermore, with this camera body 1, the protruding part 140b extending above the CMOS image sensor 110 from the standard part 140a of the main circuit board 140 overlaps the EVF 180 when viewed in the second direction (the left and right direction in landscape orientation). Since the space above the body mount 150 is thus effectively utilized, the parts can be disposed more efficiently, and this affords a more compact camera body 1.

(5) With this camera body 1, the second upper end 191a of the shutter drive device 191 is disposed at a position that is lower than the first upper end 150c of the body mount 150. Accordingly, the first bottom face 180a (an example of the lower end of the EVF) of the EVF 180 disposed above the shutter drive device 191 can be disposed at a position that is lower than the first upper end 150c of the body mount 150, so the size of the camera body 1 in the up and down direction can be reduced.

(6) With this camera body 1, the hot shoe 121 is disposed above the body mount 150, but the EVF 180 is disposed so as not to be above the body mount 150. Furthermore, when viewed in the second direction, the EVF 180 is disposed so as to overlap the hot shoe 121. Therefore, the size in the up and down direction of the camera body 1 can be reduced as compared to when the relatively thick hot shoe 121 is disposed above the EVF 180, and this affords a more compact camera body 1.

(7) With this camera body 1, the capacitor 133 is disposed in the space above the CMOS image sensor 110 produced by eliminating the conventional optical viewfinder function. Accordingly, dead space can be effectively utilized, and the overall size of the camera body 1 can be reduced.

(8) With this camera body 1, since the EVF 180 is rotatably connected to the camera body 1, when the EVF 180 is rotated from the eye level position (first disposition) to the waist level position (an example of the second disposition), the user can look at the EVF 180 from above the camera body 1 without having to lift the EVF 180 to eye level in order to check the subject. Since the subject can thus be checked with ease, the camera is easier to operate.

Also, with this camera body 1, the EVF 180 is disposed at the upper right when viewed from the subject side in the first direction in a state of landscape orientation, and when the camera body 1 is gripped in one hand, the EVF 180 can be turned with the other hand from the eye level position (first disposition) to the waist level position (an example of the second disposition), which makes the camera easier to operate.

(9) With this camera body 1, the devices necessary for the flash device 130 are disposed in the space produced by eliminating the conventional optical viewfinder function. Since dead space is thus effectively utilized, the size of the camera body 1 can be reduced.

6: Other Embodiments

The specific constitution of the present invention is not limited to the above embodiment, and various modifications and alterations are possible without departing from the gist of the present invention.

(A) In the above embodiment, the digital camera was capable of capturing both still and moving pictures, but may instead be capable of capturing only still pictures, or only moving pictures. Also, the digital camera is not limited to an interchangeable lens type of digital camera, and may instead be a digital still camera or a digital video camera, for example.

(B) In the above embodiment, the second disposition is what is known as the waist level position, and the first optical axis and second optical axis are substantially at right angles in the state of the second disposition, but the angle formed by the first optical axis and second optical axis in the second disposition state may be some other angle. Also, the configuration may be such that the angle of the second optical axis with respect to the first optical axis can be selected from among a plurality of angles, so that the EVF 180 is held at the selected angle. Alternatively, the configuration may be such that the angle of the second optical axis with respect to the first optical axis can be continuously varied, so that the EVF 180 can be held at any angle desired.

(C) In the above embodiment, the first bottom face 180*a* or the second bottom face 180*b* was the lower end of the EVF 180, but it is also conceivable that some other portion of the EVF 180 will be the lower end.

(D) In the above embodiment, the EVF 180 was a unit rotatably attached to the camera body 1, but the EVF 180 may instead be constituted so as to be integrated with the camera body 1.

(E) In the above embodiment, the display device 120 was provided to the rear face of the housing member 160, but may be provided to some other place, such as the upper face 160*a* or a side face. In the above embodiment, the display device 120 and the EVF 180 are both provided, but the configuration may instead be such that only the EVF 180 is provided.

(F) In the above embodiment, the entire hot shoe 121 overlapped the EVF 180 when viewed in the second direction, but the hot shoe 121 may be disposed so that only a portion of it overlaps the EVF 180.

(G) The electrical contact 151 may be supported by the body mount 150. for example, the electrical contact 151 may be provided between the inner edge 150*b* and outer edge 150*a* of the body mount 150.

(H) The processing that was performed by the CMOS circuit board 111 in the above embodiment may instead be performed by the main circuit board 140. For instance, A/D conversion processing could be performed by the main circuit board 140 rather than by the CMOS circuit board 111. Also, part of the processing that was performed by the main circuit board 140 in the above embodiment may be performed by the CMOS circuit board.

What is claimed is:

1. A camera body to which a lens unit configured to form an optical image of a subject can be mounted, comprising:
   a body mount to which the lens unit can be mounted;
   an imaging element including a light receiving face arranged to receive light passing through the lens unit, and convert an optical image of the subject into an electrical signal;
   a shutter disposed between the body mount and the imaging element, and arranged to block light passing through the lens unit;
   a shutter drive device configured to control the exposure time of the imaging element by driving the shutter; and
   an electronic viewfinder including an eyepiece, a viewfinder image display unit configured to electronically display an image of the subject, and a viewfinder optical system arranged to guide the subject image displayed by the viewfinder image display unit to the eyepiece, and disposed above the shutter drive device and beside the body mount when viewed in a first direction perpendicular to the light receiving face in a landscape orientation as the camera body is landscape-oriented in normal photography,
   wherein the electronic viewfinder is disposed so that the height at which the lower end of the electronic viewfinder is positioned is lower than the height at which the upper end of the body mount is positioned in the landscape orientation.

2. The camera body according to claim 1, wherein,
   when viewed in a first direction perpendicular to the light receiving face in the landscape orientation, the shutter drive device is disposed beside the body mount.

3. The camera body according to claim 2, further comprising
   a shutter button, wherein
   the shutter drive device and the electronic viewfinder are disposed on the opposite side from the shutter button with respect to the body mount.

4. The camera body according to claim 3, wherein,
   when viewed from the subject side in a first direction perpendicular to the light receiving face in the landscape orientation, the shutter drive device and the electronic viewfinder are disposed on the right side of the body mount.

5. The camera body according to claim 4, further comprising
   a main circuit board disposed on the opposite side of the imaging element from the body mount, wherein,
   when viewed in a second direction parallel to the light receiving face in the landscape orientation, at least part of the main circuit board overlaps the electronic viewfinder.

6. The camera body according to claim 5, wherein
   the main circuit board includes a standard part disposed on the opposite side from the body mount with respect to the imaging element, and a protruding part extending above the imaging element from the standard part and overlapping the electronic viewfinder when viewed in a second direction parallel to the light receiving face in the landscape orientation.

7. The camera body according to claim 6, further comprising
   a hot shoe to which a universal external device can be mounted, wherein
   at least part of the hot shoe overlaps the electronic viewfinder when viewed in a second direction parallel to the light receiving face in the landscape orientation.

8. The camera body according to claim 7, wherein
the hot shoe is disposed above the body mount when viewed in a first direction perpendicular to the light receiving face in the landscape orientation.

9. The camera body according to claim 8, further comprising
a capacitor configured to store electrical charges, wherein, when viewed in a first direction perpendicular to the light receiving face in the landscape orientation, the capacitor is disposed above the imaging element, and the electronic viewfinder is disposed beside the capacitor.

10. The camera body according to claim 1, wherein
the electronic viewfinder is connected to the camera body in a state in which a first optical axis of the lens unit is substantially parallel to a second optical axis of the viewfinder optical system.

11. The camera body according to claim 1, wherein,
when viewed from the subject side in a first direction perpendicular to the light receiving face in the landscape orientation, the shutter drive device and the electronic viewfinder are disposed on the right side of the body mount.

12. The camera body according to claim 1, further comprising
a main circuit board disposed on the opposite side of the imaging element from the body mount, wherein,
when viewed in a second direction parallel to the light receiving face in the landscape orientation, at least part of the main circuit board overlaps the electronic viewfinder.

13. The camera body according to claim 12, wherein
the main circuit board includes a standard part disposed on the opposite side from the body mount with respect to the imaging element, and a protruding part extending above the imaging element from the standard part and overlapping the electronic viewfinder when viewed in a second direction parallel to the light receiving face in the landscape orientation.

14. The camera body according to claim 1, further comprising
a capacitor configured to store electrical charges, wherein, when viewed in a first direction perpendicular to the light receiving face in the landscape orientation, the capacitor is disposed above the imaging element, and the electronic viewfinder is disposed beside the capacitor.

15. An imaging device for acquiring an image of a subject, comprising:
a lens unit configured to form an optical image of a subject; and
the camera body according to claim 1, to which the lens unit can be mounted.

16. A camera body to which a lens unit configured to form an optical image of a subject can be mounted, comprising:
a body mount to which the lens unit can be mounted;
an imaging element including a light receiving face arranged to receive light passing through the lens unit, and convert an optical image of the subject into an electrical signal;
a shutter disposed between the body mount and the imaging element, and arranged to block light passing through the lens unit;
a shutter drive device configured to control the exposure time of the imaging element by driving the shutter; and
an electronic viewfinder including an eyepiece, a viewfinder image display unit configured to electronically display an image of the subject, and a viewfinder optical system arranged to guide the subject image displayed by the viewfinder image display unit to the eyepiece, and disposed above the shutter drive device and beside the body mount when viewed in a first direction perpendicular to the light receiving face in a landscape orientation,
wherein the electronic viewfinder is rotatably connected to the camera body, and can be in a first disposition in which the first optical axis of the lens unit is substantially parallel to the second optical axis of the viewfinder optical system, and a second disposition different from the first disposition.

17. A camera body to which a lens unit configured to form an optical image of a subject can be mounted, comprising:
a body mount to which the lens unit can be mounted;
an imaging element including a light receiving face arranged to receive light passing through the lens unit, and convert an optical image of the subject into an electrical signal;
a shutter disposed between the body mount and the imaging element, and arranged to block light passing through the lens unit;
a shutter drive device configured to control the exposure time of the imaging element by driving the shutter;
an electronic viewfinder including an eyepiece, a viewfinder image display unit configured to electronically display an image of the subject, and a viewfinder optical system arranged to guide the subject image displayed by the viewfinder image display unit to the eyepiece, and disposed above the shutter drive device and beside the body mount when viewed in a first direction perpendicular to the light receiving face in a landscape orientation; and
a hot shoe to which a universal external device can be mounted,
wherein at least part of the hot shoe overlaps the electronic viewfinder when viewed in a second direction parallel to the light receiving face in the landscape orientation.

18. The camera body according to claim 17, wherein
the hot shoe is disposed above the body mount when viewed in a first direction perpendicular to the light receiving face in the landscape orientation.

* * * * *